United States Patent [19]

Norvell

[11] Patent Number: 4,595,377
[45] Date of Patent: Jun. 17, 1986

[54] COLD CATHODE FABRICATION FOR RING LASER GYROSCOPE

[75] Inventor: Gordon S. Norvell, Huntington Beach, Calif.

[73] Assignee: Rockwell International Corporation, El Segundo, Calif.

[21] Appl. No.: 679,711

[22] Filed: Dec. 10, 1984

[51] Int. Cl.$^4$ .......................... H01S 3/097; H01J 9/02
[52] U.S. Cl. ................................. 445/28; 313/346 R; 372/87; 372/99
[58] Field of Search .............. 445/28, 49, 50; 372/87, 372/88, 99; 313/346 R

[56] References Cited

U.S. PATENT DOCUMENTS

| | | | |
|---|---|---|---|
| 3,486,058 | 12/1969 | Hernqvist | 313/346 R |
| 3,535,758 | 10/1970 | Hoet | 445/49 |
| 3,876,957 | 4/1975 | Thatcher | 445/28 X |
| 3,955,152 | 5/1976 | Lewis | 372/88 X |
| 4,392,229 | 7/1983 | Hostetler | 372/87 X |

Primary Examiner—Kenneth J. Ramsey
Attorney, Agent, or Firm—H. Fredrick Hamann; James F. Kirk

[57] ABSTRACT

Method of fabricating an cold cathode for a laser such as ring laser gyro characterized by the use of vitreous carbon as the material of the cathode. For this purpose a predetermined amount of resin is pressed formed into the shape of a hollowed cathode body which is then heated in an oxygen free environment form a vitreous shaped cathode by thermal degradation of the resinous body. The vitreous carbon material reduces the difference between the coefficients of thermal expansion of the housing and electrode which can cause the indium seal to fail, e.g., in the case of prior aluminum cathode. The electrical connection may be made via either a silver epoxy or indium solder.

9 Claims, 10 Drawing Figures

COLD CATHODE FABRICATION FOR RING LASER GYROSCOPE

BACKGROUND OF THE INVENTION

1. Field of the Invention

This invention relates to a method of fabricating an improved cold electrode or cathode for use with a laser. The invention cold electrode is of particular use in ring laser gyro applications that require the use of a cold or unheated cathode.

2. Description of the Prior Art

Ring laser gyroscopes typically use an unheated or cold aluminum cathode on the ring laser gyro body as a source of electron emission for laser operation. Ring laser gyro bodies are commonly manufactured from materials having a very low coefficient of thermal expansion to achieve positional stability between optical elements such as mirrors. The life of the gyro is influenced by several factors including the emission stability of the active surface within the electrode or cathode and the life of the seal established between the cold electrode and the gyro body. Electrodes or cathodes made of aluminum have very high thermal coefficients of expansion in relation to the thermal coefficient of expansion of the ring laser gyro body material. Thermal cycling of the gyro and the cathode results in thermal cycling of the mechanical seal between the cathode and the gyro body. A large difference between the thermal expansion of the cathode and the thermal expansion of the gyro body produces a large strain on the cathode seal with each thermal cycle. A large strain on the gyro seal, coupled with a large number of thermal cycles, contributes to a shortened gyro life.

SUMMARY OF THE INVENTION

It is, therefore, a major objective of this invention to provide a method of manufacturing a cold electrode having a long emission life and a substantially reduced level of strain in the seal between the cathode and laser body.

These and other objectives of the invention are realized in accordance with the invention in a method of manufacturing a cold electrode from non-metallic materials such as vitreous carbon.

PREFERRED EMBODIMENT

Figure 1:
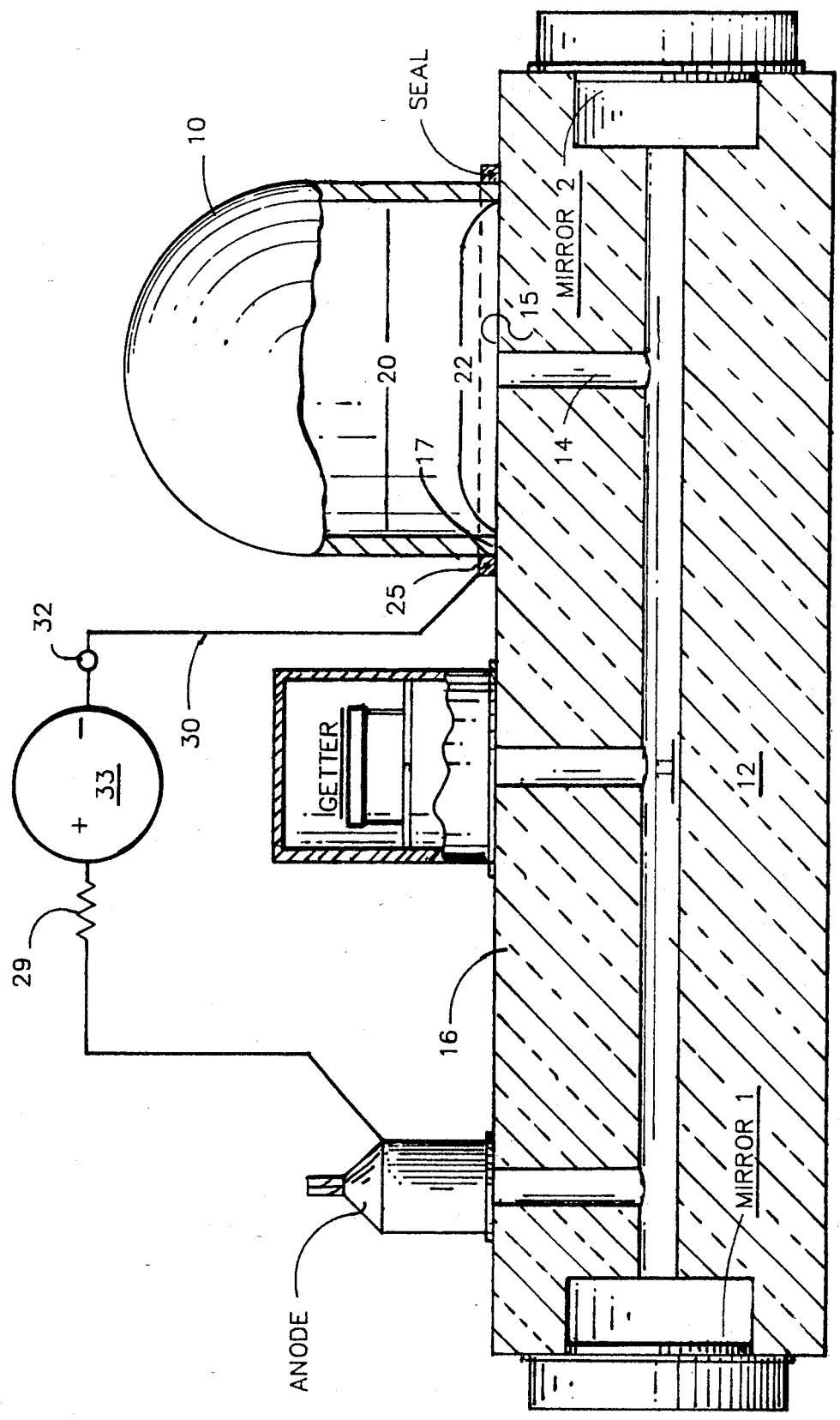
FIG. 1 is a combination schematic, partial elevation, partial section view.
Figure 2:
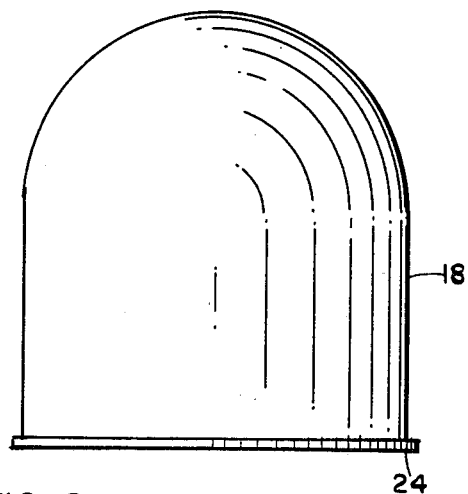
FIG. 2 is a front view of the cold electrode.
Figure 3:
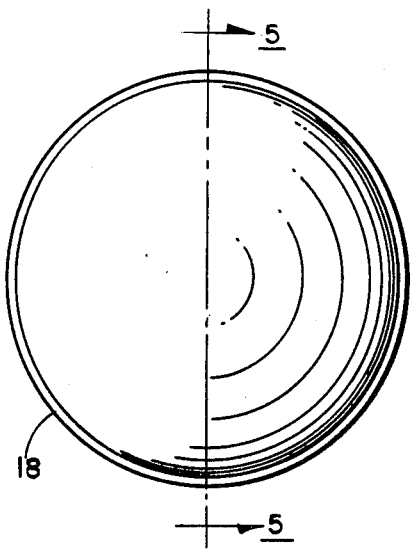
FIG. 3 is a top view of the cold electrode.

FIG. 1 shows an improved cold electrode 10 formed by the invention method for making an improved cold electrode for electron emission. The cold electrode 10 is depicted as being engaged with or seated on a laser housing 12. The laser housing 12 is formed from a homogeneous material such as a block of glass ceramic material such as ZERODUR ®, (a trademark of the JENA$^{ER}$ GLASSWERK SCHOTT & GEN. of MAINZ, GERMANY). ZERODUR ® has a coefficient of thermal expansion of approximately $5 \times 10^{-8}$ cm/cm/°C. The laser housing has a resonant cavity 11 containing a gain medium, such as a mixture of Helium and Neon gas. The gain medium is vented via vent 14 to a surface location 15 on the laser housing surface 16.

The improved cold electrode 10 is formed by the method of using a non-metallic, machinable, homogenous material characterized by a conductivity in the range of $30 \times 10^{-4}$ to $80 \times 10^{-4}$ ohm-cm and a thermal coefficient of expansion of approximately $2.5 \times 10^{-6}$ cm/cm/°C., to form an electrode body 18 having at least one cavity 20 and an aperture 22.

Figure 4:
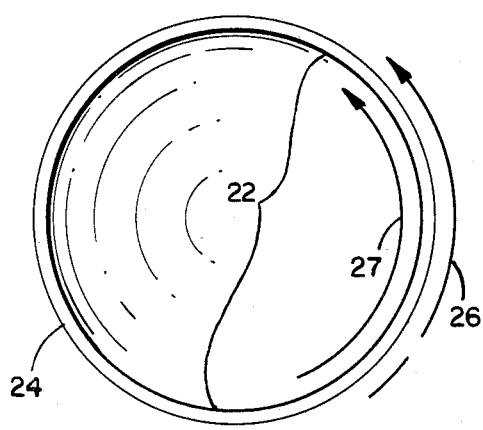
FIG. 4 is a bottom view of the cold electrode.
Figure 5:
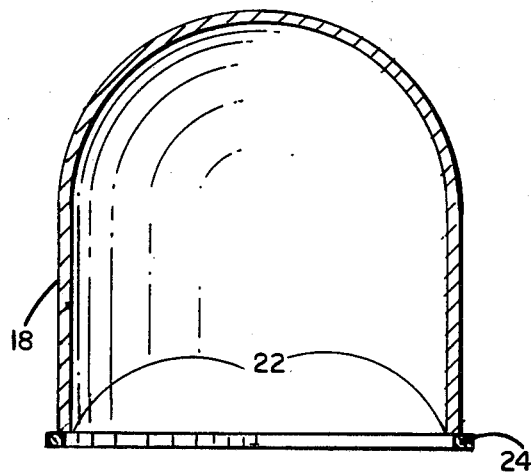
FIG. 5 is a side sectional view of the cold electrode.

FIG. 4 is a bottom view of the cold electrode body 18 showing an electrode support surface 24 formed as a perimeter around the body aperture 22. Outer perimeter 26 and inner perimeter 27 of the electrode support surface are also shown. The electrode support surface 24 is formed to be complementary, i.e. to be polished to match, the laser housing surface for complementary engagement with the laser housing surface at 17.

FIG. 1 shows the electrode support surface 24 being sealed by SEAL 25 to the housing surface at 17. The aperture 22 is positioned on the laser housing support surface 16 to contain the housing vent 14.

Figure 6D:
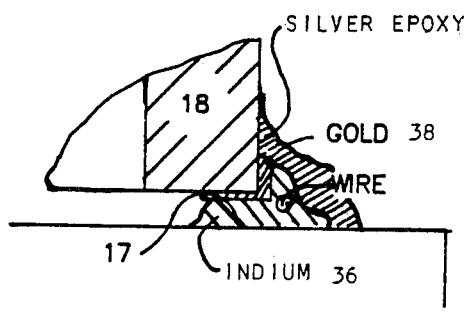
Figure 7:
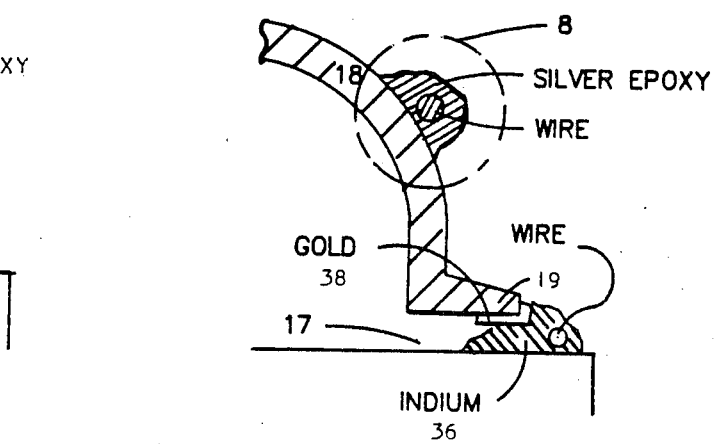
FIG. 7 is a side sectional view of an electrode seal and an electrode housing having an enlarged base or foot, and also showing an alternate means within circle, 8 of making an electrical connection to the housing.

FIG. 1 also shows wire 30 coupled from terminal 32 to seal 25. FIGS. 6d and 7 show alternative seals and characterize how wire 30 makes an electrical contact to the electrode body 18 via indium 36 and gold coat 38 to pass current therethrough.

In another alternative method, the step of forming an electrode body further comprises the step of selecting vitreous carbon to be the machinable homogenous non-metallic material from which the electrode body 18 is formed.

Vitreous carbon is a glassy form of carbon which has properties that differ from those of common carbon or graphite. The properties of vitreous carbon that are useful for this invention include: a low helium permeability; a low coefficient of linear expansion; a high strength and hardness; an ability to be polished; a chemical inertness; a resistance to high temperature and sufficient electrical conductivity to allow functioning as a laser electrode. A commercial form of vitreous carbon, "Vitrecarb", may be purchased from High Performance Materials of 5140H West 104th St., Inglewood, Calif. 90304.

Vitreous carbon is produced by the thermal degradation, in an oxygen free environment, of organic polymers such as phenol-aldehyde novolac and resole types. The resulting material is highly cross-linked and has glassy properties. The above mentioned polymers may be molded or cast into predetermined shapes prior to thermal degradation. The process selected determines the producibility and precision of the finished electrode or cathode 10.

The steps of FIGS. 6a, 6b, 6c and 6d show the steps of another alternative embodiment of the method and apparatus. These figures show the steps of sealing the electrode support surface 24 to the laser housing surface.

Figure 6A:
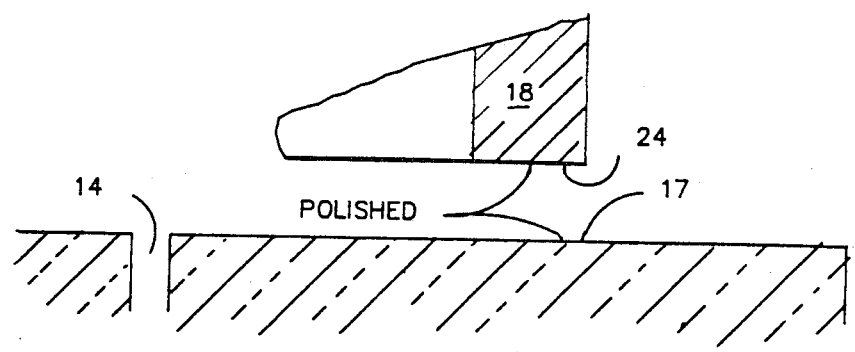
FIGS. 6a, 6b, 6c, 6d is a Flow Chart showing the steps of the invention method.

FIG. 6a shows the step of polishing the laser housing surface 17 surrounding the vent to achieve a flat surface and machining the electrode support surface 24 to be complementary to the plane of the laser housing surface 17 surrounding the vent 14. The surfaces are lapped and polished on a polishing table. The gold is applied using a small brush as the electrode body is spun on a rotating table.

Figure 6B:
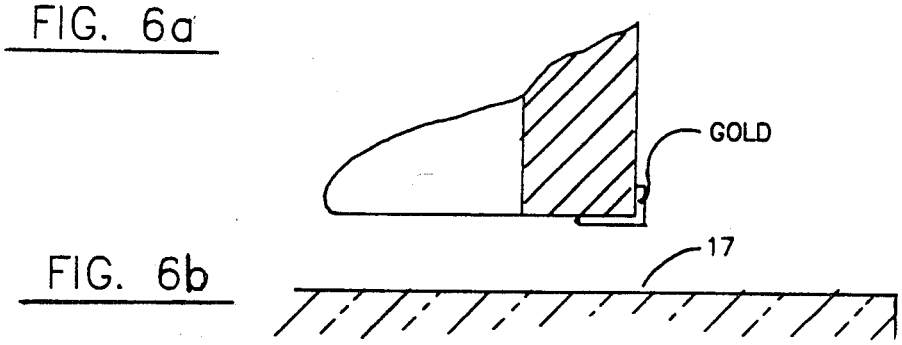

FIG. 6b shows the gold applied so as to avoid the inner periphery thereby preventing indium from entering cavity 20 and being exposed to the ionized gas.

The gold used to coat the electrode support surface 24 is typically an organo-metallic compound such as solution #7336 from Englehard Inc. of 1 W. Central Avenue, E. Newark, N.J. 07029. Raising the temperature of coated electrode support surface 24 to 450° C. for approximately two minutes will cause the organo-metallic compound to decompose and deposit a metallic gold film on the coated support surface 24. The indium is alloyed with the gold film to form a bead on the support surface while being heated in vacuum to approximately 175° C. for five to ten minutes.

FIG. 6b shows the step of applying a thin coat of gold to electrode support surface to form a metallized support surface 25.

Figure 6C:
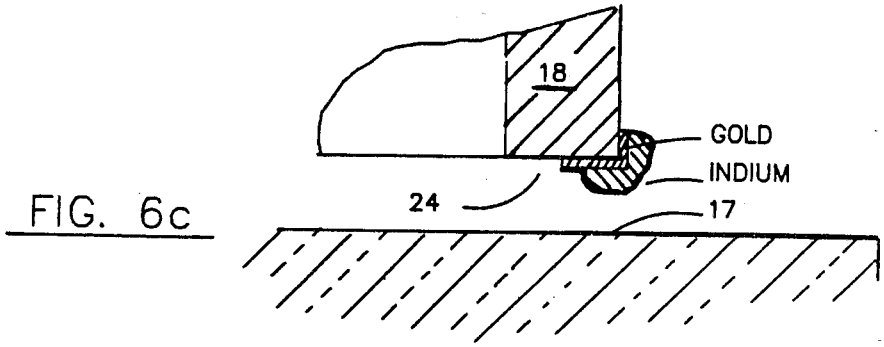

FIG. 6c shows the step of coating the metallized support surface 28 with indium 29. The indium coated, metallized support surface 24 is then typically super cleaned along with surface 16 in a plasma cleaner. The metallized support surface 24 is then positioned on the polished laser housing surface 17 surrounding the vent 14. The electrode housing is then pressed, using a predetermined force characterized not to fracture the body 18, onto the laser housing surface 17 to form an indium seal between the metallized electrode support surface 24 and the polished laser housing surface 17.

The invention method for making an improved cold electrode for electron emission provides the step of forming the cold electrode from a non-metallic material, such as vitreous carbon, having an active surface, i.e. cavity 20, in fluid or gaseous contact with an ionized gas medium, such as a mixture of helium and neon gas.

Plating the active surface of the electrode with metal such as aluminum is contemplated as another alternative embodiment of the invention electrode having improved seal life and low electrode resistance. The metal chosen would be deposited using ion-evaporation and deposition in a vacuum.

In typical operation, the ionized gas medium receives the electron emission from the cold electrode or cathode active surface. The ionized gas forms an electrical contact to the electrode body in cavity 20 and passes the electron emission from the cold electrode or cathode to an electrode or anode of opposite polarity.

The step of forming an electrode body 18 further comprises the step of selecting the electrode body material from all non-metallic conductive materials such as vitreous carbon.

Vitreous carbon is a unique material. It is glass-like and is formed by the thermal decomposition of an organic resin. Pressure is employed to compact the carbon while the resin is being decomposed. This carbon is highly cross-linked, which is in contrast to the laminar structure of graphite.

The step of forming a cold electrode configuration also provides the step of using a non-metallic machinable homogenous material characterized as having conductivity in the range of $30 \times 10^{-4}$ to $80 \times 10^{-4}$ ohm-cm and a thermal coefficient of expansion of less than $2.5 \times 10^{-6}$ inches per inch. In this embodiment method, the electrode body is formed to have at least one cavity and an aperture as shown in FIGS. 1 through 6. Configurations having more than one aperture are to be anticipated as normal extensions of this invention method.

In another alternative embodiment, the step of forming an electrode configuration, such as body 18 shown in FIGS. 1 through 4, further comprises the steps of selecting the non-metallic material from the family of materials formed by the steps of placing a predetermined amount of fusible resin, such as ring fusion polymers of the phenol-aldehyde novolac and resole types, containing a predetermined amount of carbon in a die. This step is followed by forcing or pressing the mixture into the die form to form a predetermined cathode body shape 18. The body shape is then heated in an oxygen free environment at a time and temperature selected to fuse the body shape and to leave only trace amounts of resin in the resulting electrode.

The step of forming the cold electrode configuration above also comprises steps of: forming the electrode configuration 10 to have an electrode body 18; forming the electrode body 18 to have an aperture 22 for passage of the ionized gas medium therethrough. The aperture 22 is shaped to be complementary to a mounting surface 17. The electrode body is next sealed, via seal 25, to the complementary mounting surface 17 to prevent loss of the helium-neon gas mixture.

In typical embodiments, a barium flash getter is inductively heated and fired in the cavity to maintain gas purity by reacting with active contaminants in the helium-neon mixture such as trace amounts of oxygen, nitrogen, hydrogen, carbon monoxide, carbon dioxide, and other trace compounds to form stable non-gaseous compounds.

As stated earlier, indium seals are degraded by temperature extremes due to the large difference between the coefficients of expansion of the aluminum cathode and the laser body. As a laser is exposed to temperature extremes of $-65°$ C. to $100°$ C. the indium seal is stressed beyond its elastic limit. This amount of stress will eventually cause seal failure. It is, therefore, of great value to use an electrode or cathode with a low coefficient of thermal expansion to diminish the difference between the thermal coefficient of expansion of the electrode and that of the body of the laser or gyro.

A solution to the above-mentioned problems is obtained if vitreous carbon is used in place of aluminum. The coefficient of thermal expansion of vitreous carbon is $2.2 \times 10^{-6}$ cm/cm/°C. This coefficient represents more than a tenfold reduction in strain over that achieved using aluminum. Vitreous carbon has a thermal coefficient of expansion that is sufficiently low to match to ultra-low expansion gyro body.

It is also highly desirable to use a cathode that is highly sputter resistant. Aluminum cathodes are intentionally coated with a plasma induced aluminum oxide film. While aluminum oxide is relatively sputter resistant, aluminum metal is not. Therefore, the quality of an aluminum cold cathode is dependent upon the integrity of the aluminum oxide film.

Particular embodiments of the invention electrode use an electrode body of vitreous carbon that have an unexpected advantage over conventional electrodes of aluminum. Operation of an aluminum electrode at a current density high enough to produce sputtering destroys the active oxidized surface causing premature electrode or cathode failure. Inadvertant or temporary operation of an electrode of vitreous carbon sufficient to produce sputtering will produce slight surface contamination within the laser housing but will not degrade the cathode, because the invention electrode requires no oxide coating and is therefore not subject to the failure mode of the coated aluminum electrode. This property of the vitreous carbon cathode has in fact been demonstrated. A test cathode formed from vitreous carbon was operated a long test period and was then disassembled and inspected. A deposit presumed to be carbon was noted on the glass-ceramic body underneath the cathode. The cathode operation was normal throughout the test interval and the helium-neon gas color remained normal. The test interval for this cathode was in excess of several hundreds of hours.

Referring to the circuit of FIG. 1, typical helium-neon lasers use a ballast resistor 29 to add to the combined electrode and plasma resistance to limit the circuit current driven by voltage source 33. The carbon electrode 10 of the invention has a higher circuit resistance than a comparably sized aluminum cathode and, in practice, dissipates enough power to be self heating. The heat produced by the carbon cathode 10 is effective in reducing the formation of contaminants such as moisture on the cathode 10 and on the gyro body in the vicinity of the cathode. In addition, an electrode of vitreous carbon is believed to be substantially less chemically active than aluminum. It is therefore reasonable to believe that future tests of an electrode of vitreous carbon will show that the invention electrode does not act as a getter in service as do electrodes of aluminum. Electrodes of aluminum that act as getters are contaminated and experience a shortened life as a result of this process.

FIG. 7 shows the seal means of FIG. 6c without a silver epoxy coating over the indium. The electrode support surface is made large by forming the housing 18 to have a foot 19 at its base. An alternative method of making an electrical contact with the housing is shown in circle 8. This method includes the step of attaching a wire to the housing by use of conventional silver epoxy.

Although the invention method has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A method for making an improved cold electrode for electron emission and for engagement with a laser housing, said laser housing being formed from a homogeneous material having a coefficient of expansion of less than $10 \times 10^{-8}$ cm per cm/°C., and having a resonant cavity containing an ionized gain medium, said ionized gain medium being vented to a surface location on said laser housing surface, said improved cold electrode being formed by the method of:

using a non-metallic machinable homogenous material characterized by a resistivity in the range $30 \times 10^{-4}$ to $80 \times 10^{-4}$ ohm-cm and a thermal coefficient of expansion of less than $2.5 \times 10^{-6}$ cm per cm/°C., to form an electrode body having at least one cavity and an aperture, forming an electrode support surface as a perimeter around said body aperture, said electrode support surface being complementary to said laser housing surface for complementary engagement with said laser housing surface, sealing said electrode support surface to said housing surface, said laser housing support surface being positioned to contain said housing vent, and coupling an electrical contact to said electrode body to pass current therethrough.

2. The method of claim 1 wherein said step of forming an electrode body further comprises the step of:

selecting vitreous carbon to be said machinable homogenous non-metallic material.

3. The method of claim 1 wherein said step of forming an electrode body further comprises the step of:

mixing a predetermined amount of fusible resin in a die;

pressing said mixture into a die form to form a predetermined cathode body shape, removing said predetermined cathode body shape from said die, and heating said body shape in a substantially oxygen free environment at a time and temperature selected to fuse said body shape.

4. The method of claim 1 wherein the step of sealing said electrode support surface to said laser housing surface further comprises the steps of:

polishing said laser housing surface surrounding said vent to achieve a flat surface, machining said electrode support surface to be complementary to the plane of said laser housing surface surrounding said vent, metallizing electrode support surface with gold coating, coating said metallized support surface with indium, heating said indium coated metallized support surface to a temperature above the melting point of indium to alloy said gold coating with said indium, positioning said indium coated, metallized support surface on said polished laser housing surface to contain said vent, said ionized gain medium laser housing exhausting into said electrode aperture, pressing said electrode housing onto said laser body housing to form an indium seal between said polished laser housing surface and said metallized electrode support surface.

5. A method for making an improved cold electrode for electron emission and in engagement with a housing surface by the method of:

forming a cold cathode configuration from a homogenous non-metallic material of low helium permeability;

providing said cold cathode with an electrode support periphery for mounting with said housing surface, said cold electrode having a surface in fluid or gaseous contact with an ionized gas medium, said ionized gas medium receiving said electron emission from said cold cathode surface; and, forming a hermetic seal between said support periphery of said cathode and said housing; and, coupling an electrical contact to said cold cathode to pass electrons therethrough.

6. The method of claim 1 wherein said step of forming an electrode body further comprises the step of:

selecting vitreous carbon to be said non-metallic material.

7. The method of claim 5 wherein the step of forming a cold electrode configuration further comprises the step of:

using a non-metallic machinable homogenous material characterized by a resistivity in the range of $30 \times 10^{-4}$ to $80 \times 10^{-4}$ ohm-cm and a thermal coefficient of expansion of less than $2.5 \times 10^{-6}$ cm per cm/°C., to form an electrode body having at least one cavity and an aperture.

8. The method of claim 5 wherein said step of forming an electrode configuration further comprises the steps of:

selecting said non-metallic material from the family of materials formed by the steps of:

mixing a predetermined amount of fusible resin;

pressing said mixture into a die form to form a predetermined cathode body shape, and heating said body shape in an oxygen free environment at a time and temperature selected to fuse said body shape.

9. The method of claim 5 wherein the step of forming said cold electrode configuration further comprises the steps of:

forming said electrode configuration to have an electrode body, forming said electrode body to have a concave shape for passage of said ionized gas medium through said support periphery.

* * * * *